(12) United States Patent
Cali et al.

(10) Patent No.: US 7,770,706 B2
(45) Date of Patent: Aug. 10, 2010

(54) STRUT BASED OVERRUNNING PULLEYS

(75) Inventors: Connard Cali, Dublin, CA (US); Carlos Ferreira, Santa Catarina (BR)

(73) Assignee: Conntechnical Industries, Inc., Pleasanton, CA (US)

( * ) Notice: Subject to any disclaimer, the term of this patent is extended or adjusted under 35 U.S.C. 154(b) by 470 days.

(21) Appl. No.: 11/839,294

(22) Filed: Aug. 15, 2007

(65) Prior Publication Data

US 2008/0041687 A1 Feb. 21, 2008

Related U.S. Application Data (60) Provisional application No. 60/822,472, filed on Aug. 15, 2006.

(51) Int. Cl.
*F16D 41/12* (2006.01)
(52) U.S. Cl. ............ 192/42; 192/46; 192/55.1; 192/55.3; 192/69.1; 192/71
(58) Field of Classification Search ............ 192/46, 192/55.1–55.3, 55.6, 69.1
See application file for complete search history.

(56) References Cited

U.S. PATENT DOCUMENTS

| | | | |
|---|---|---|---|
| 5,139,463 A | 8/1992 | Bytzek et al. | |
| 5,156,573 A | 10/1992 | Bytzek et al. | |
| 5,597,057 A | 1/1997 | Ruth et al. | |
| 5,722,909 A | 3/1998 | Thomey | |
| 5,855,263 A * | 1/1999 | Fergle | 192/46 |
| 5,918,715 A | 7/1999 | Ruth et al. | |
| 5,979,627 A * | 11/1999 | Ruth et al. | 192/55.6 |
| 6,083,130 A | 7/2000 | Mevissen et al. | |
| 6,089,112 A * | 7/2000 | Kelly et al. | 74/7 C |
| 6,116,394 A | 9/2000 | Ruth | |
| 6,186,299 B1 | 2/2001 | Ruth | |
| 6,761,656 B2 | 7/2004 | King et al. | |
| 2008/0196990 A1 * | 8/2008 | Cali et al. | 192/46 |

OTHER PUBLICATIONS

International Search Report and Written Opinion mailed Feb. 4, 2008 for PCT Application No. PCT/US2007/076000.

* cited by examiner

*Primary Examiner*—Richard M. Lorence
(74) *Attorney, Agent, or Firm*—Alan Taboada; Moser IP Law Group (57) ABSTRACT

Embodiments of the present invention include strut based overrunning pulleys that provide one or more of greater durability, lower heat generation, high torque loads carrying capability, potentially tunable vibration dampening, tunable to maximum permissible torque loads before elastic (repeatable) slippage, and/or ease of end of life assessment. In some embodiments, a pulley assembly includes a shaft; a pocket plate having a plurality of pockets; a notch plate adjacent the pocket plate and having a plurality of notches facing the pockets of the pocket plate; a plurality struts disposed in the pockets; a resilient member disposed within the pockets and biasing the struts towards the notches; and a body disposed about the shaft, pocket plate, and notch plate; wherein one of the pocket plate or the notch plate is rotationally coupled to the shaft and the other of the pocket plate or the notch plate is rotationally coupled to the body.

18 Claims, 9 Drawing Sheets

| COMPARISON TABLE | ROLL CLUTCH PULLEYS | SPRING DECOUPLER PULLEYS | STRUT PULLEY |
|---|---|---|---|
| FLUCTUATION ABSORBING | NO (ONE-WAY POWER CLIPPING) | YES | YES |
| TUNABLE TO SPECIFIC FREQUENCIES | NO | YES | YES |
| OVERRUNNING SPEED | ALTERNATOR > PULLEY | ALTERNATOR = PULLEY | ALTERNATOR = PULLEY |
| PHASE DIFFERENCE | NO | YES | YES |
| LOAD SENSITIVITY | YES | NO | NO |
| MATERIAL OPTIONS | HEAT TREATED STEEL | STEEL | STEEL, ALUMINUM, THERMOPLASTICS, THERMOSETS |
| EASE IN PROJECTING BALANCE OF LIFE STATUS | DIFFICULT | VERY DIFFICULT | EASY |
| HEAT GENERATION | HIGH | HIGH | LOW |
| TORQUE LIMITING (REPEATABLE) | NO | NO | YES |
| LOAD CARRYING POTENTIAL | LOW | MEDIUM | HIGH |
| ROTATIONAL INERTIA | HIGH | HIGH | LOW |
| EASE OF REBUILDING | MEDIUM (REGRIND AND REPLACE COMPONENTS) | DIFFICULT (REPLACE SPRING AND CLUTCH MATERIAL) | EASY (REPLACE STRUTS ONLY) |

FIG. 9

| CHARACTERISTICS TABLE | ROLL DRIVE | STRUT DRIVE |
|---|---|---|
| DROP-IN REPLACEMENT | YES | YES |
| STRESS TO RADIAL FORCE | 99% | 25% |
| STRESS TO USEFUL TORQUE | 10% | 96% |
| OVERRUN LIFE | SHORT | LONG |
| OVERRUN SPEED (LONG TERM) | (FAIL) | 15,000 + RPM |
| SENSITIVITY TO VIBRATION | HIGH | LOW |
| POSITIVE LOCK DESIGN | NO | YES |
| TORSIONAL WINDUP AND IMPACT | YES | NO |
| HEAT GENERATION | HIGH | LOW |
| NOISE LEVEL | MEDIUM | SILENT |
| FUNCTIONAL TORQUE CAPACITY | 43.2 FT. LBS | > 118.7 FT. LBS |

STRUT BASED OVERRUNNING PULLEYS

CROSS-REFERENCE TO RELATED APPLICATIONS

This application claims benefit of U.S. provisional patent application Ser. No. 60/822,472, filed Aug. 15, 2006, which is herein incorporated by reference.

BACKGROUND OF THE INVENTION

1. Field of the Invention

Embodiments of the present invention generally relate to torque load transfer, limitation, and vibration dampening device designs.

2. Description of the Related Art

The increase in power features in vehicles continues to increase power demands from the vehicle's electrical system. As a result, charging and starting units and hybrid motor designs have incrementally increased amperage output to over 200 amps.

The larger starters and alternators combined with more complex engine accessories now found in the serpentine belt system, lead to rotational torque load spikes. These spikes are transferred to the alternator via its pulley. If either not dampened or too high, they can potentially damage the charging unit or other components in the belt system, including the belt itself.

To mitigate some of these problems, vibration dampening pulley designs have been conceived and implemented in charging units. Likewise, larger roll clutch or specially heat treated roll clutch drives have been attempted to carry the larger torque loads. A prominent pulley design relies on the use of a roll clutch mechanism to overrun and absorb loads. Another prominent pulley design relies on the use a combination coil spring and phenolic friction clutch mechanism to overrun and absorb loads.

However, neither of these designs have proven sufficiently durable for the noted applications. The roll clutch design requires high quality heat treated alloy steel components, tends to overheat and fail after extended overrun conditions, and slips under permanent mechanical deformation when faced with frequent, high torque loads.

The spring and friction clutch mechanism is complex in design, tends to early spring fatigue failures, builds up heat and cracks the clutch mechanism, and is nearly impossible to ascertain its remaining end of life balance without scrupulous technical inspection of the spring metallography and phenolic material conditions.

Thus, a need exists for a simple design that may offer one or more of greater durability, lower heat generation, capability of carrying high torque loads, potentially tunable vibration dampening, tunable to maximum permissible torque loads before elastic (repeatable) slippage, and/or ease of end of life assessment.

SUMMARY OF THE INVENTION

Embodiments of the present invention include strut based overrunning pulleys that provide one or more of greater durability, lower heat generation, high torque loads carrying capability, potentially tunable vibration dampening, tunable to maximum permissible torque loads before elastic (repeatable) slippage, and/or ease of end of life assessment. In some embodiments, a pulley assembly includes a shaft; a pocket plate disposed about the shaft and having a plurality of pockets formed on a first side thereof; a notch plate disposed about the shaft and adjacent the pocket plate, the notch plate having a plurality of notches formed on a side of the notch plate facing the pockets of the pocket plate; a plurality struts disposed in the pockets; a resilient member disposed within the pockets and biasing the struts towards the notches; and a body disposed about the shaft, pocket plate, and notch plate; wherein one of the pocket plate or the notch plate is rotationally coupled to the shaft and the other of the pocket plate or the notch plate is rotationally coupled to the body.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The drawings depicted herein are simplified for ease of understanding and may not be drawn to scale. Similar reference numerals used between the drawings indicate identical or similar components.

DETAILED DESCRIPTION

Embodiments of the present invention include strut based overrunning pulleys that provide one or more of greater durability, lower heat generation, high torque loads carrying capability, potentially tunable vibration dampening, tunable to maximum permissible torque loads before elastic (repeatable) slippage, and/or ease of end of life assessment. Such pulley designs may be used in such non-limiting applications as industrial conveyor systems, starting and/or charging (alternators & hybrid) systems in engines and motors, or the like.

The pulley designs disclosed herein are based on low-mass rectangular struts. The struts are positioned between a plate with pockets for the retracted struts and a second plate with notches for the strut engagement. The struts may be planar (perpendicular to the axis of rotation) or radial (parallel to the axis of rotation).

The struts have a very high ratio of contact area to mass, yet are slim enough to achieve full engagement with a low degree of pivot. The low mass, rectangular construction, and lengthwise pivoting axis of the struts give them a very low moment of rotational inertia.

Further, a viscous wall of lubricant is dynamically created during even low overrun speeds, compressing the struts against their support springs, and effectively parking the struts into their respective pockets, away from any contact with the notch plate.

Figure 1:
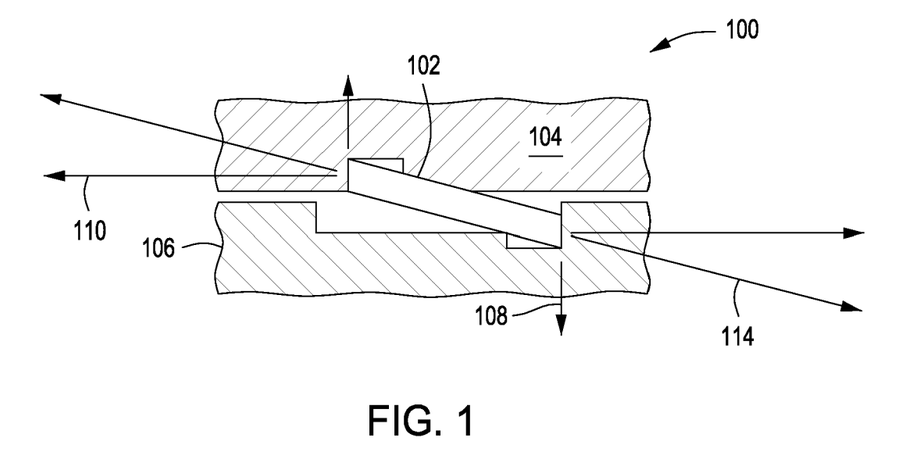
FIG. 1 depicts a partial view of a strut-based overrunning pulley in accordance with some embodiments of the invention.

For example, FIG. 1 depicts a partial side view in cross-section illustrating the operation of a strut based overrunning pulley 100 in accordance with some embodiments of the present invention. The pulley 100 includes a notch plate 104 and a pocket plate 106 having one or more struts 102 disposed therebetween. The notch plate 104 and the pocket plate 106 may be fabricated from the same or different materials and may be fabricated from at least one of metals (such as steel, aluminum, or the like), plastics, thermoplastics, thermosets, resins, or the like. The notch plate 104 and the pocket plate 106 may be mounted to a shaft (not shown) and are configured to rotate independent of each other when the struts 102 are not engaged. One of the notch plate 104 or the pocket plate 106 is rotationally fixed to the shaft and the other of the notch plate 104 or the pocket plate 106 is rotationally decoupled from the shaft. The component that is rotationally decoupled from the shaft is typically coupled to another body, such as a grooved or flat pulley body, a gear, a sprocket, or the like.

Thus, when the notch plate 104 and the pocket plate 106 rotate with respect to each other in a direction opposite the drive direction (such as in an overrun condition), the struts 102 do not engage with the notches. However, when the notch plate 104 and the pocket plate 106 begin to rotate with respect to each other in the opposite direction (the drive direction), the struts 102 quickly engage with the notches and rotationally couple the notch plate 104 and the pocket plate 106, and thereby the elements coupled to the notch plate 104 and the pocket plate 106 (e.g., a shaft and a pulley or other drive component).

The struts 102 may be fabricated from metals (such as steel, aluminum, or the like), plastics, thermoplastics, thermosets, resins, or the like, and sit in corresponding recesses, or pockets, formed in the pocket plate 106. A spring, or other mechanism, (not shown in FIG. 1) biases one end of the struts 102 out of the pocket and towards the notch plate 102. A plurality of notches are formed in the notch plate 104 to selectively engage with the struts 102.

When engaged, the strut 102 is compressed between the notch in the notch plate 104 and the pocket in the pocket plate 106, thereby rotationally coupling the shaft and the drive component (such as a pulley body) via the notch plate 104 and the pocket plate 106. The strut design is extremely efficient, developing only a small parasitic force 108. Thus, a large majority of the compressive force 114 applied to the struts 102 is converted to a driving force 110 of the assembly.

Figure 2A:
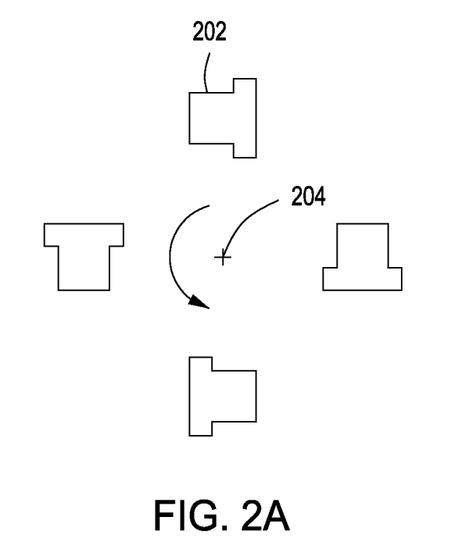
FIGS. 2A-B respectively depict planar and radial configurations of the struts of FIG. 1.
Figure 2B:
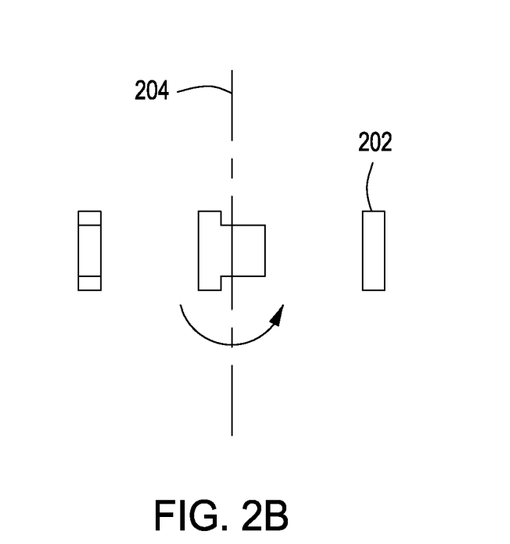

The strut based overrunning pulley designs of the present invention may be configured in either a planar or radial configuration. For example, FIG. 2A depicts a planar configuration of the struts. As shown in FIG. 2A, one or more struts 202 may be configured around an axis of rotation 204 such that the engagement surfaces of the struts 202 are substantially perpendicular to the axis of rotation 204 (e.g., the struts lie flat in a planar arrangement). Alternatively, for example, FIG. 2B depicts a radial configuration of the struts. As shown in FIG. 2B, the struts 202 may be configured around the axis of rotation 204 such that the engagement surfaces of the struts 202 are substantially parallel to the axis of rotation 204 (e.g., the engaging/disengaging motion of the struts is radial with respect to the axis of rotation).

Figure 3:
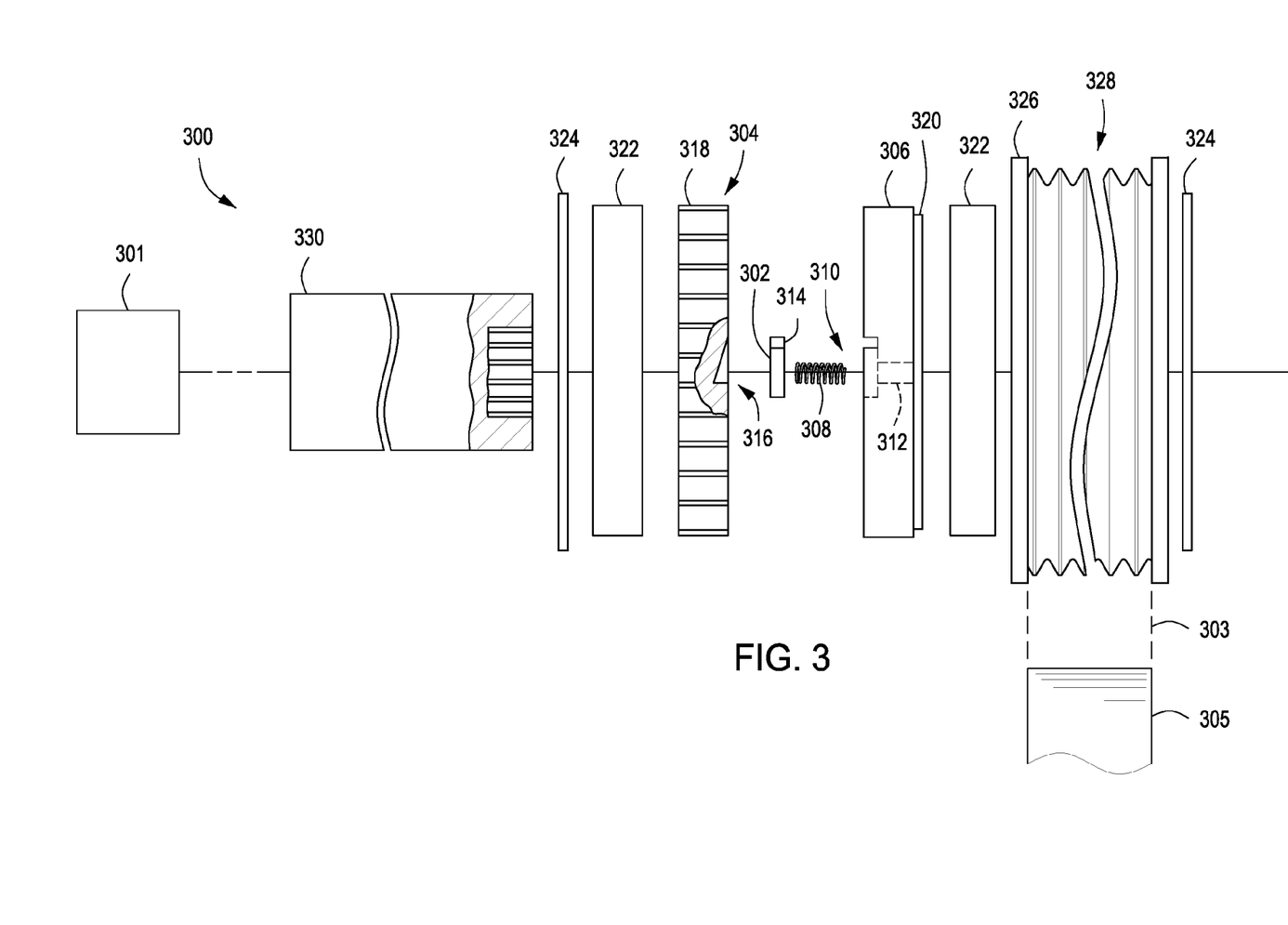
FIG. 3 depicts an exploded view of a planar strut-based overrunning pulley in accordance with some embodiments of the present invention.

The strut based overrunning pulley designs of the present invention have many embodiments. For example, FIG. 3 depicts an exploded view of a planar strut-based overrunning pulley 300 in accordance with some embodiments of the present invention. The pulley 300 includes a notch plate 304 and a pocket plate 306 having one or more struts 302 disposed therebetween for selectively rotationally coupling the notch plate 304 and the pocket plate 306 as described above with respect to FIG. 1. The number of struts 302 provided may be selected to provide a desired torsional load capacity for the overrunning pulley. In a non-limiting example, using a 6 mm wide by 2.3 mm thick rectangular strut made of carbon steel, an operational torque carrying limit of 59 ft-lbs was obtained using a single strut, 118.7 ft-lbs for two struts, and 177.8 ft-lbs for three struts. It is contemplated that greater numbers of struts may also be utilized. As a comparison, a conventional roll clutch having 7 steel rollers was found to have a calculated static torque carrying limit prior to roll clutch race failure of 43.2 ft-lbs.

The notch plate 304 includes a plurality of notches 316 configured to selectively engage with an edge of the struts 302. The number and arrangement of the notches may be varied to control the degree of rotation of the notch plate 304 before the struts 302 become engaged. In some embodiments, the notches 316 may be configured to rotate between about 3 to 15 degrees prior to engagement of the struts 302 and the notches 316.

The pocket plate 306 typically includes a corresponding pocket 310 for each strut 302. The struts 302 may comprise a feature, such as a flange or protrusion 314 to facilitate locating and locking the strut 302 in position in the pockets 310 of the pocket plate 306. The protrusion 314 acts as a pivot point about which the strut 302 may rotate, thereby facilitating the extension of the end of the struts 302 into and out of the notches 316 during operation, while retaining the struts 302 in position within the assembly. The struts 302 are outwardly biased with respect to the pockets 310 by a resilient element, such as springs, resilient members, or the like. For example, in the embodiment shown in FIG. 3, a spring 308 may be disposed in an opening 312 formed in the pocket 310 to bias an end of the strut 302 away from the pocket plate 306 and towards the notch plate 304. The opening 312 may be disposed only partially through the pocket plate 306, or as shown in FIG. 3, the opening 312 may extend through the entire pocket plate 306 and a floor plate, or washer 320 may be provided for the resilient element (e.g., spring 308) to rest against.

A shaft 330 may be provided and may be rotationally fixed to one of the notch plate 304 or the pocket plate 306. In some embodiments, a starter motor 301 may be rotationally coupled to the shaft 330. In the embodiment shown in FIG. 3, the pocket plate 306 is coupled to the shaft 330. One or more bearings 322 (two shown in FIG. 3) may be disposed on either side of the notch plate 304/pocket plate 306 assembly. The notch plate 304/pocket plate 306 assembly and any bearings, washers, or additional components disposed about the shaft 330 are sometimes referred to as a core assembly.

A pulley body 326 may be disposed about the core assembly and locked into place with one or more lock rings 324. The pulley body typically has a drive surface 328 for interfacing with a drive component for transferring torque between the pulley body 326 and the drive component. In some embodiments, a flywheel 305 of an engine may be rotationally coupled to the pulley body 326. The pulley body 326 and the flywheel 305 are configured to remain rotationally coupled before, during, and after operation of the starter motor 301. For example, as shown in FIG. 3, the drive surface 328 is a v-grooved surface configured to mate with a v-belt 303. It is contemplated that the drive surface 328 may be flat or have other configurations to interface with any other type of drive mechanism, such as belts, chains, gears, or the like.

The one of the notch plate 304 or the pocket plate 306 that is not coupled to the shaft 330 may be coupled to the pulley body 326. In the embodiment shown in FIG. 3, the notch plate 304 is coupled to the pulley body 326. Accordingly, the notch plate 304 may have a feature, such as a plurality of splines 318 on an outer diameter of the notch plate 304 to interface with a corresponding feature (such as a plurality of mating splines, not shown) that may be provided on an inner surface of the pulley body 326. In all embodiments described herein, the splines may be straight (as shown), or the splines may be helical. It is contemplated that, alternatively, and in all embodiments described herein unless specifically excluded, the notch plate 304 may be coupled to the shaft and the pocket plate may be coupled to the pulley body in like fashion as described in the various embodiments herein.

Given the dynamic function and load carrying design of the pulley 300, the components of the pulley 300 may be fabricated, at least in part, from any robust, light-weight material, such as phenolics, engineered resins, and the like, or combinations thereof. For example, the pulley 300 may embody a thermoplastic or thermoset pulley body 326. In some embodiments, the component rotationally coupled to the pulley body 326 (e.g., the notch plate 306 in the embodiment shown in FIG. 3) may be incorporated into a single piece assembly (for example, by being cast, molded, or machined from a single piece of material).

Figure 4A:
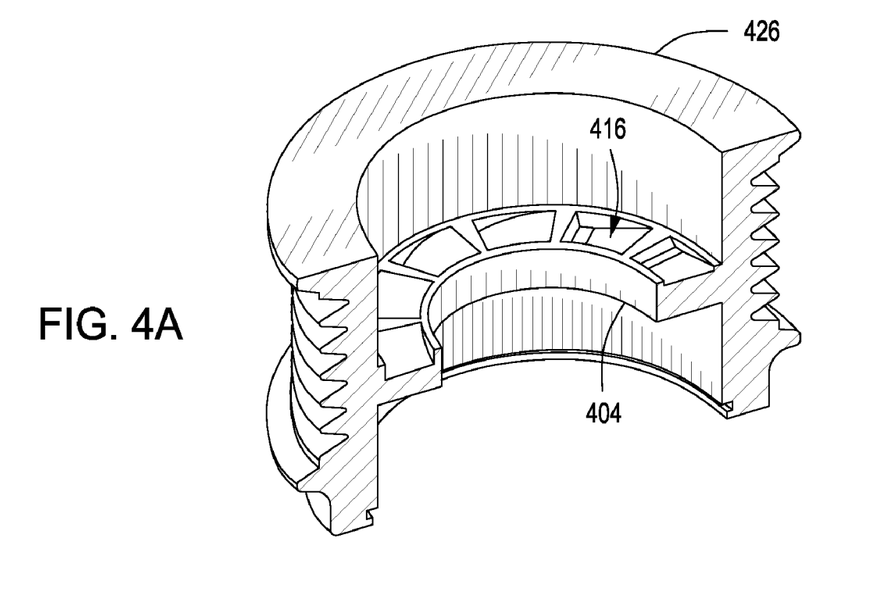
FIGS. 4A-B depict pulley body variations in accordance with some embodiments of the present invention.
Figure 4B:
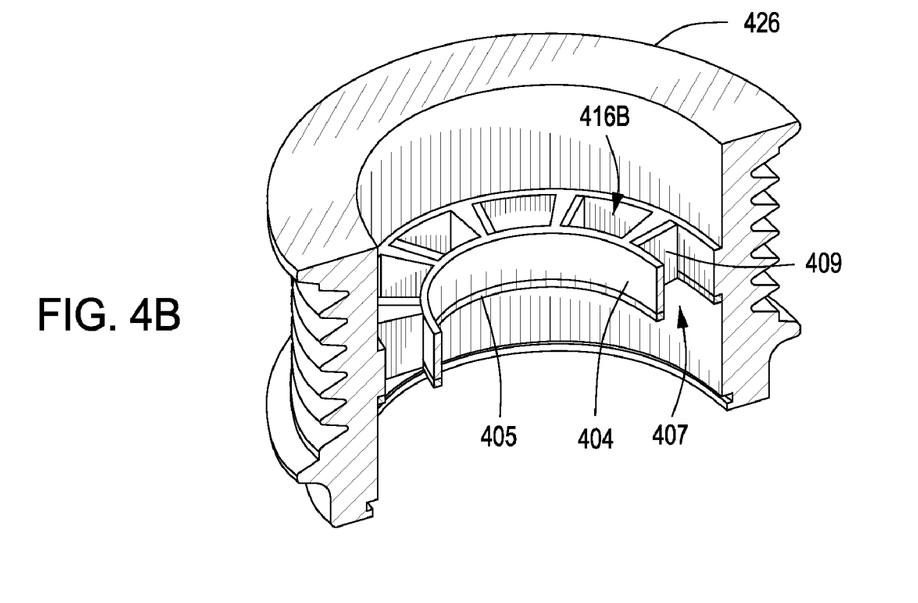

For example, as shown in FIG. 4A, a pulley body 426 may be provided that has a notch plate 404 with notches 416 formed in a single piece. The single piece construction simplifies the design, fabrication, and assembly of the pulley 300. In some embodiments, as shown in FIG. 4B, the pulley body 426 and integral notch plate 404 may have notches $416_B$ that extend completely through the notch plate 404 to define a plurality of windows 407. Optionally, a support washer 405 may be disposed beneath the notch plate 404 and may further have a plurality of support members 409 that extend into the window 407 and rest against an edge of the notches $416_B$ to provide additional support to the edge of the notches $416_B$ where the struts will engage during operation. The support washer 405 and the support members 409 may be formed from a washer that is stamped or otherwise cut to define the support member on two or three sides. The support member 409 may then be bent upwards (e.g., approximately perpendicular to the support washer 405) to be disposed against the edges of the windows 407.

Whether or not the pulley body includes the notch plate, the use of a non-metallic pulley body significantly reduces the mass of the pulley assembly. Such mass reduction translates to reduced rotational inertia, which, in turn, translates to faster wind-up and thus faster unit amperage output, greater responsiveness to vibration dampening, and lower overall charging unit weight leading to better fuel economy.

Embodiments of pulley assemblies as described herein may be utilized in numerous applications, such as starter drives, alternator systems, and other drive interfaces in automotive and non-automotive environments (such as motorized vehicles, hybrid vehicles, lawn mowers, industrial conveyor systems, and the like). In one non limiting example, any of the embodiments described herein may be utilized in a starter system of a motor. For example, a certain geometry interface—such as a spur gear, a helical gear, a rubber cylinder, or a pulley—may be juxtaposed to the engine's flywheel, in constant contact/mesh therewith. To start the engine, a solenoid would not be necessary to advance the starter's gear into mesh with the flywheel, as it is already meshed therewith. Thus, upon ignition, the starter's armature would be energized and rotate immediately, turning the struts into the notch plate, and rotating the in-mesh interface with the flywheel. Once the combustion engine's rotational speed is greater than the rotational speed of the starter motor, the struts would disengage and decouple from the notches of the notch plate. The boundary layer created by the grease/oil during overrun between the pocket and notch plate would push the struts down against the springs, and park the struts (e.g., decouple them) away from any contact with the notch plate. Thus, while the combustion engine is running, the only portion of the starting system that would be spinning would be the in-mesh component with the flywheel, since the rest of the starter is decoupled from that interface via the 'parked' struts (e.g., the rest of the starter is decoupled because the struts are not engaged).

Figure 5A:
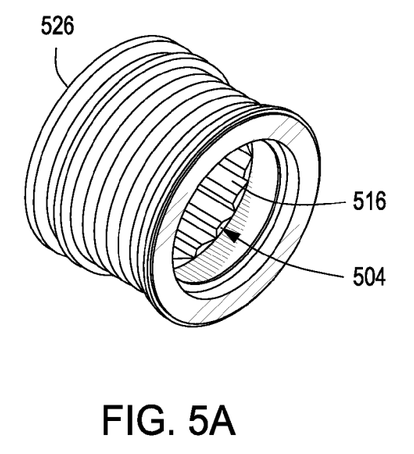
FIGS. 5A-D depict perspective views of a radial strut-based overrunning pulley in accordance with some embodiments of the present invention.
Figure 5B:
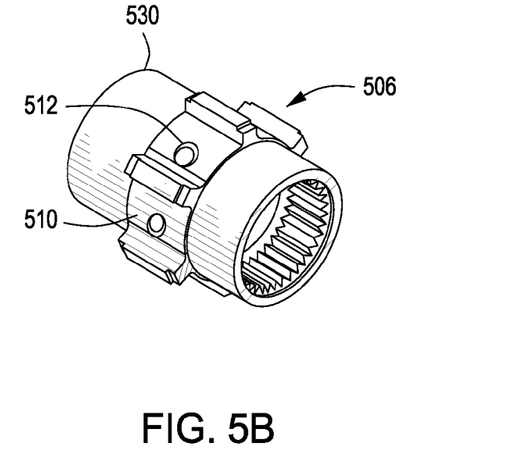
Figure 5C:
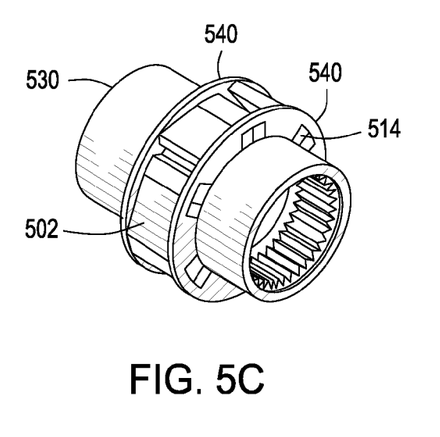
Figure 5D:
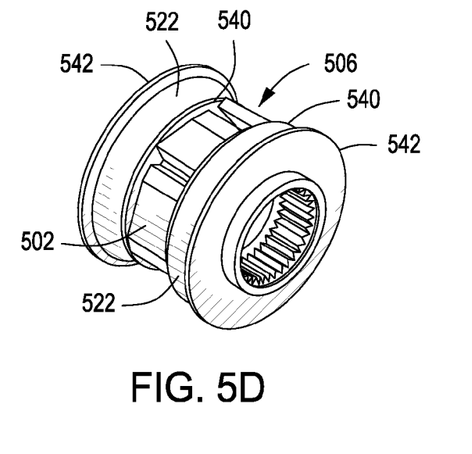

FIGS. 5A-D illustratively depict perspective views of a radial strut based pulley in accordance with some embodiments of the present invention. As shown in FIG. 5A, a pulley body 526 may be provided having a built in radial notch plate 504 and radial notches 516. Alternatively, a separate radial notch plate may be provided and rotationally coupled to the pulley body 526 interior. As shown in FIG. 5B, a shaft 530 may be provided having a built in radial pocket plate 506 with radial pockets 510 and radial holes 512 to receive resilient members (not shown) for outwardly biasing the struts. Alternatively, a separate radial pocket plate may be provided and rotationally coupled to the shaft 530. As shown in FIG. 5C, one or more struts 502 may be disposed in the pockets 510. A pair of strut holdback and guide washers 540 may be provided to retain the struts 502 in position and to guide their movement as the ends of the struts 502 move in and out of the pockets 510. The washers 540 not only guide the struts 502 during their function, but also hold down the rear protrusions 514 of the struts 502, thereby ensuring no strut bounce-back into the notches 516 during high rpm conditions. As shown in FIG. 5D, one or more bearings 522 (two shown) may be disposed on either side of the struts 502. The pulley body 526 may be positioned over the core assembly of the shaft 530, struts 502, washers 540, and bearings 522 and locked into place with lock washers 542.

In operation, the shaft 530 and the pulley body 526 are rotationally independent due to the bearings 522 disposed therebetween until the outwardly biased struts 502 engage the notches 526 in the pulley body 526, thereby rotationally locking the pulley body 526 and the shaft 530. When the relative rotational speeds of the pulley body 526 and the shaft 530 are such the pulley goes into overrun mode, the struts 502 disengage from the notches 516 and are pushed back into the pockets 510, thereby allowing free rotation of the pulley body 526 with respect to the shaft 530.

Figure 6A:
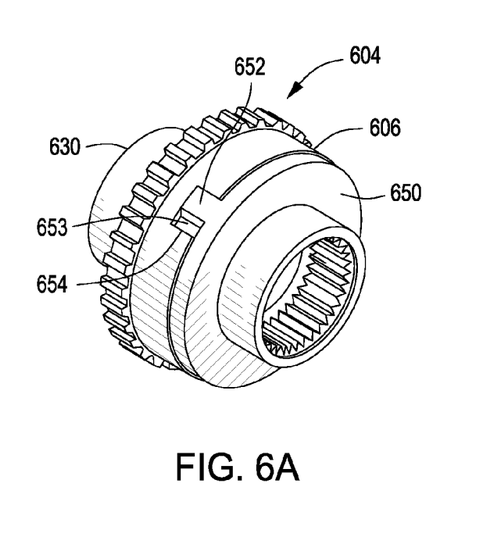
FIGS. 6A-B depict perspective views of an overrunning pulley having vibration dampening features in accordance with some embodiments of the present invention.
Figure 6B:
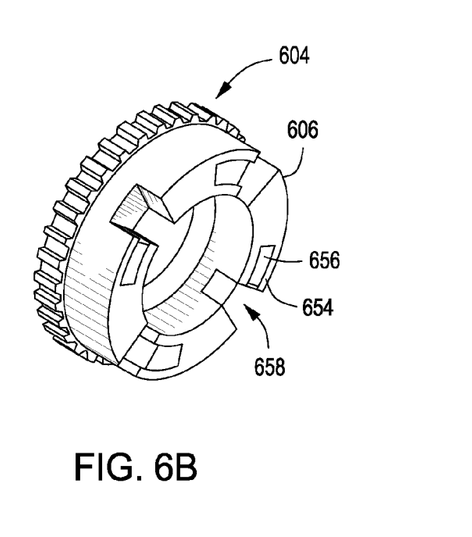

In some embodiments, the planar or radial strut based overrunning pulleys may include a vibration dampening mechanism. For example, FIGS. 6A-B depict a partial view of a planar strut based pulley having a notch plate 604 and a pocket plate 606 disposed about a shaft 630. The notch plate 604 and the pocket plate 606, as well as the remaining components that are not explicitly shown, may be similar to the components described above with respect to FIG. 3.

In the embodiment shown in FIG. 6A-B, and as best seen in FIG. 6B, the pocket plate 606 is rotationally decoupled from the shaft and further includes one or more pockets 654 formed in the pocket plate 606 on the side opposite the strut pockets. A resilient member 656 is disposed in each pocket 654. The resilient member 656 may be a spring, an elastomeric material (such as natural or synthetic rubbers), or the like. A lock plate 650 is disposed adjacent the pocket plate 606, covering the resilient member 656 and the pockets 654. The lock plate 650 may be part of the shaft 630 or may be rotationally coupled thereto. A protrusion 653 on the lock plate 650 extends into the pocket 654 and radially engages the resilient member 656 when the lock plate 650 rotates with respect thereto. Optionally, a rear portion of the pocket 654 may be completely open, forming a cut-out 658 in the pocket plate 606. A corresponding protrusion 652 may be disposed on the lock plate 650 to interlock with the cut-out 658 of the pocket plate 606. The protrusion 652 is generally smaller than the cut-out 658 of the pocket plate 606 to allow some amount of rotation between the lock plate 650 and the pocket plate 606, thereby allowing the resilient members 656 to be compressed.

In operation, initially no struts are locked into any notches. A typical strut based pulley may have a small amount of degrees of rotation (for example, about 5 degrees) before a strut locks into a notch. During the rotation prior to engaging the struts, the rotating shaft 630 rotates the lock plate 650, which is rotationally coupled thereto, thereby compressing the resilient members 656 between the protrusions 653 of the lock plate 650 and the walls of the pocket 654. As the resilient members 656 compress, they cushion the force and gradually transfer a small amount of torque via the pocket plate 606. Once the resilient members 656 fully compress, the struts take over the ultimate load carrying responsibility of the system. The cushion system permits instant response to very fast changes in rpm and is more robust. The responsiveness to the frequency of rotational vibration can be adjusted by the controlling the k-value, or spring constant, of the cushion material (e.g., stiffer cushions mean faster response to vibrational inputs). Over time, the resilient members 656 can be inspected for obvious naked-eye problems, and easily replaced as needed without guesswork.

Figure 7A:
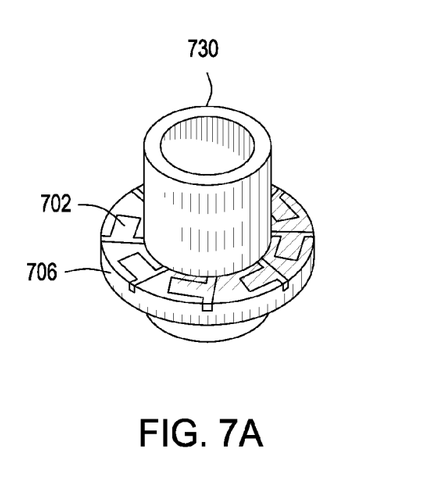
FIGS. 7A-F depict perspective views of an overrunning pulley having vibration dampening or maximum torque limitation features in accordance with some embodiments of the present invention.
Figure 7B:
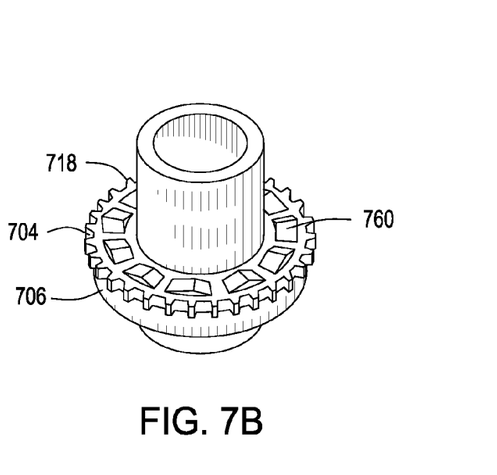

In some embodiments, the planar or radial strut based overrunning pulleys may include a vibration dampening feature or a maximum torque limiting feature. For example, FIGS. 7A-F depict perspective views of a planar strut based overrunning pulley having a vibration dampening and optional maximum torque limiting feature in accordance with some embodiments of the invention. As shown in FIG. 7A, a pocket plate 706 having a plurality of struts 702 is coupled to a shaft 730. As shown in FIG. 7B, a notch plate 704 is disposed adjacent the pocket plate 706. The notch plate 704 and the pocket plate 706, as well as the remaining components that are not explicitly shown, are similar to the components described above with respect to FIG. 3.

Figure 7C:
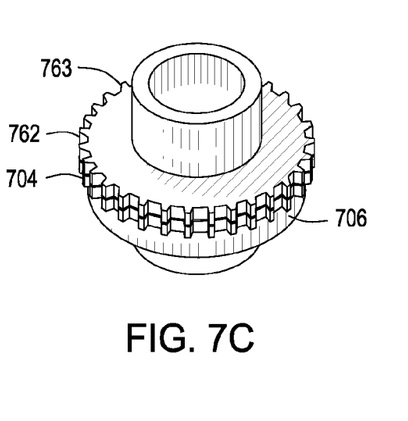

As shown in FIG. 7B, the notch plate 704 further comprises a plurality of ramps 760 formed on the side of the notch plate 704 opposite the pocket plate 706 (e.g., opposite the side of the notch plate 704 having the notches for engaging the struts 702). A compression plate 762 is disposed atop the notch plate 704, as shown in FIG. 7C. The compression plate 762 has a plurality of inverted ramps (not shown) that correspond to the ramps 760 of the notch plate 704. In the embodiments shown in FIGS. 7A-F, the notch plate 704 and the compression plate 762 each have a plurality of splines formed along their outer diameters.

Figure 7D:
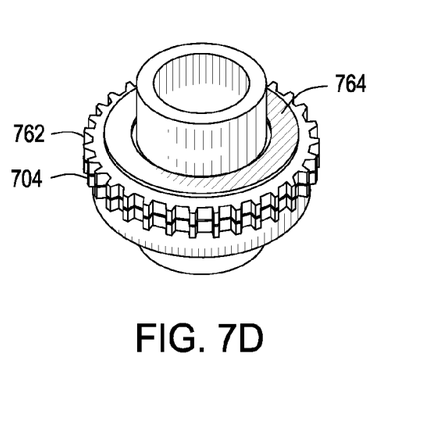
Figure 7E:
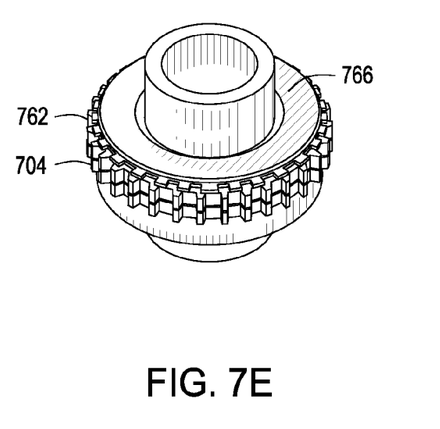
Figure 7F:
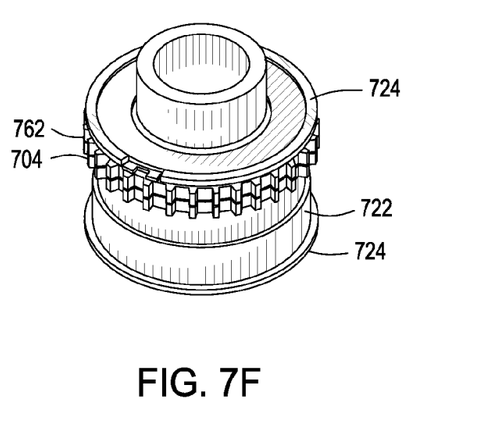

As shown in FIG. 7D a compression ring 764 is disposed atop the compression plate 762. The compression ring 764 may comprise a resilient material, such as described above with respect to the resilient member 656 in FIG. 6. A support washer 766 and a lock ring 724 are respectively disposed atop the compression ring 764, as shown in FIGS. 7E and 7F. The support washer 766 may have a plurality of splines formed along the outer diameter of the support washer 766. One or more bearings 722 may also be provided (as shown in FIG. 7F) to add stability to the assembly once the pulley body (not shown) is disposed over the core assembly.

Figure 8:
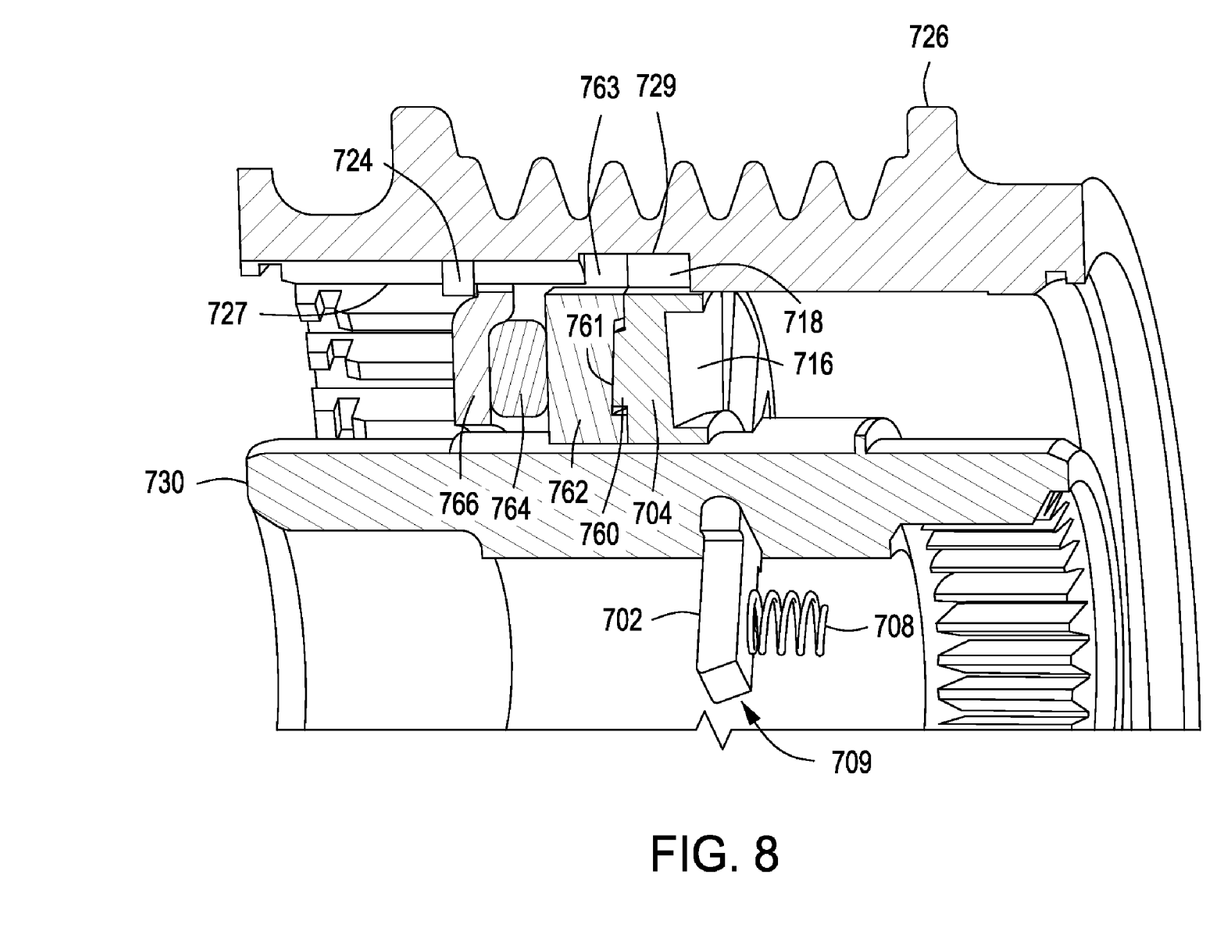
FIG. 8 depicts a partial perspective view in cutaway of the overrunning pulley of FIGS. 7A-F.

FIG. 8 depicts a partial perspective view in cutaway of the overrunning pulley of FIGS. 7A-F. The pocket plate 706 is removed from view in FIG. 8 for clarity. As shown in FIG. 8, a pulley body 726 is provided. The notch plate 704 is inserted into the pulley body in an enlarged diameter portion 729 thereof to rest against the ledge formed by the enlarged diameter portion 729. A plurality of splines 727 that match the splines 718, 763 respectively formed on the notch plate 704 and the compression plate 762 are provided along a portion of the enlarged diameter portion 729 of the pulley body 726. The splines 727 generally extend from the edge of the pulley body 726 along the enlarged diameter portion 729 and end at a distance greater than the thickness of the notch plate 704 and less than the combined thickness of the notch plate 704 and the compression plate 762. Accordingly, the notch plate 704, once pushed past the splines 727 to rest against the ledge of the enlarged diameter portion 729, is rotationally decoupled from the pulley body 726. The compression plate 762, pushed along the splines 727 to rest against the notch plate 704 remains at least partially engaged with the splines 727, and thus, rotationally coupled to the pulley body 726. In some embodiments, the compression plate 762 remains about 50 percent engaged with the splines 727. The ramps 760 of the notch plate 704 and the inverted ramps 761 of the compression plate 762 initially mesh and allow the opposing faces of the notch plate 704 and the compression plate 762 to touch. The compression ring 764 is then inserted adjacent the compression plate 762 and covered by the support washer 766 and the whole assembly is secured using the lock ring 724.

In operation, the ramps 760 may be disposed completely within the inverted ramps 761 and the notch plate 704 and the compression plate 762 may be in contact with each other. The struts 702 in the pocket plate 706 engage the notch plate 704, rotating both components. The struts 702 may be biased towards the notch plate 704 via a resilient member 708. The struts 702 may have a beveled edge 709 for engaging with the notches of the notch plate 704. The ramps 760 on the notch plate 704 engage the inverted ramps 761 of the compression plate 762, thereby rotating the compression plate 762 and the pulley body 726. The compression plate 762 may move axially, so it moves up the shaft 730, away from the ridged notch plate 704 due to the engagement of the ramps 760 and the inverted ramps 761. As the compression plate 762 moves up the shaft 730, the compression ring 764 absorbs vibration and torque variations as torque loads remain within an acceptable range. The vibration absorption capability of the assembly may be tuned by control of the k-value of the compression ring 764, the axial thickness of the compression ring 761. The desired torque range may be defined by the height of the ramps 760 and inverted ramps 761 vis-à-vis the available axial travel for compression of the compression ring 764. In some embodiments, once the torque load becomes too high, the compression plate 762 will travel axially far enough away from the notch plate 704 such that the ramps 760 of the notch plate 704 and the inverted ramps 761 of the compression plate 761 will slip, thereby relieving the torque load. Alternatively, If the available distance for axial travel is restricted such that full compression of the compression ring 764 is insufficient to allow slippage between the notch plate 704 and the compression plate 762, the assembly behaves as a vibration absorption feature only, and not as a torque limiting feature.

In one illustrative mode of operation, the above assembly may be utilized in a combustion engine having a serpentine belt for driving accessory components, such as an alternator or the like. As the engine fires, the serpentine belts speeds up. The belt drives the pulley body 726. The splines 727 of the pulley body 726 drive the compression plate 762. The compression plate 762 is in mesh with the notch plate 704 through the ramps 760 and inverted ramps 761. As the compression plate 762 and the notch plate 704 rotate, they engage the struts 702 which engages the pocket plate 706, which engages the shaft 730, which, in turn, drives the alternator shaft.

As there are rotational speed differentials between the pulley belt/body and the alternator shaft, the notch plate 704 will axially push the compression plate 762 along the pulley body 726 (axially to the left in FIG. 8). The compression plate 762 will compress the compression ring 764 up to its limit. If the ramps 760 are shallow, the axial movement of the compression plate 762 will be less (and not enough to fully compress the compression ring 764), thus creating a feature that is "torque limiting." That is, the pulley will slip at some torque, determined by the angle/heights of the ramps.

If the ramps 760 are steep, the axial movement of the additional notch plate will be greater (and sufficient to fully compress the compression ring 764). At this point, the feature will absorb the excess speed differential (e.g., "vibration spike") up to the compression stroke of the compression ring 764, and then transfer torque back through the notch plate 704, the strut 702, and to the shaft 730.

Figure 9:
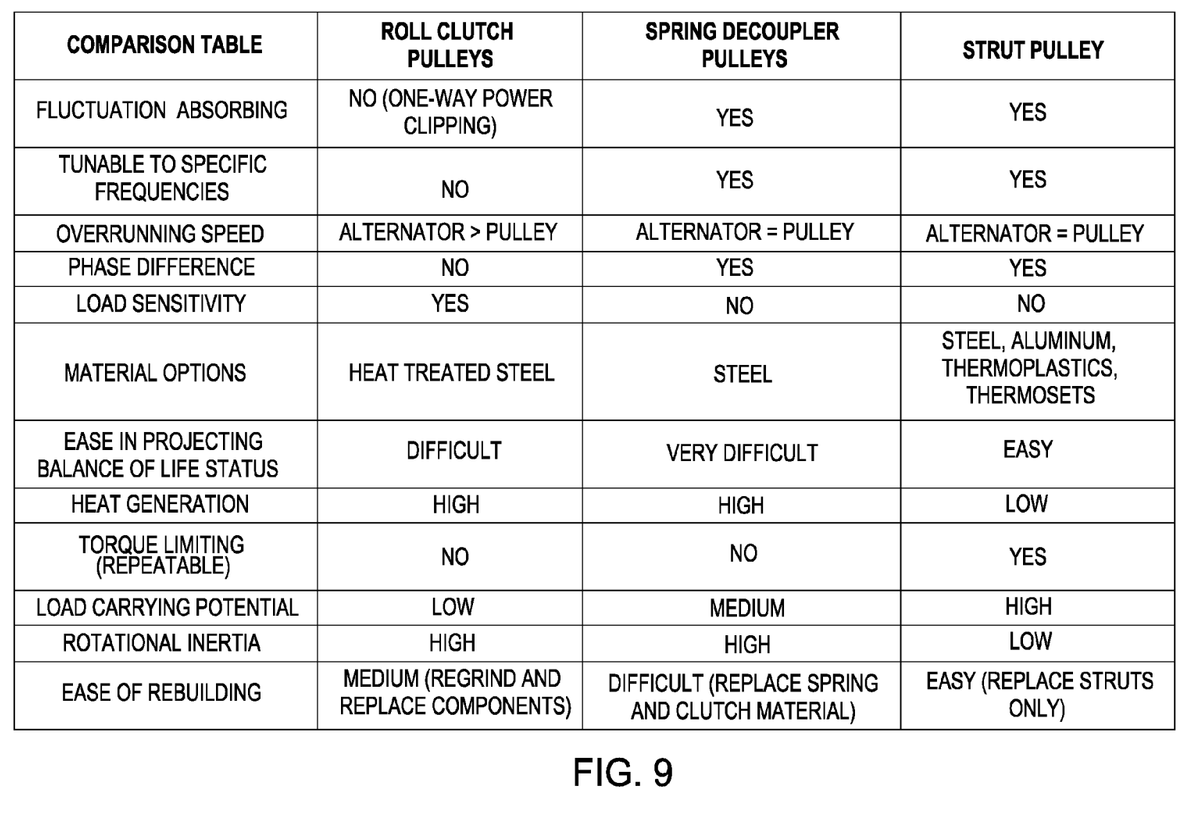
FIG. 9 depicts a table comparing conventional roll and spring decoupler pulleys versus strut pulleys in accordance with some embodiments of the present invention.

The strut based overrunning pulley designs in accordance with embodiments of the present invention provide for various improvements and enhancements as compared to conventional roll clutch, spring decoupler, and other conventional designs. For example, FIG. 9 is a table comparing conventional roll clutch pulleys and conventional spring decoupler pulleys with strut based overrunning pulleys in accordance with some embodiments of the present invention and showing the many varied advantages of the strut based pulleys as compared to the conventional designs.

Figure 10:
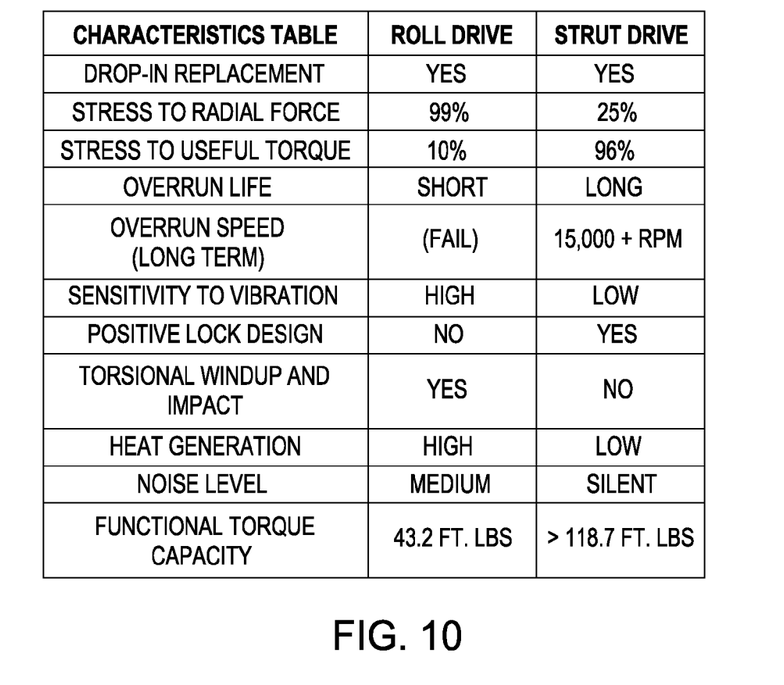
FIG. 10 depicts a table comparing characteristics of conventional roll drives versus strut drives in accordance with some embodiments of the present invention.

FIG. 10 is a table comparing a conventional roll drive (roll clutch pulley) with the strut drive (strut based overrunning pulley) in accordance with some embodiments of the present invention. As detailed in the table of FIG. 10, the strut drive has a very low stress to radial force and a very high stress to useful torque percentage (i.e., the strut configuration is very efficient). The strut drive has a long overrun life at high overrun speeds (>15,000 rpm), low sensitivity to vibration, a positive lock design, no torsional windup and impact issues, low heat generation, low noise generation, and a very high functional torque capacity as compared to the roll drive.

Figure 11:
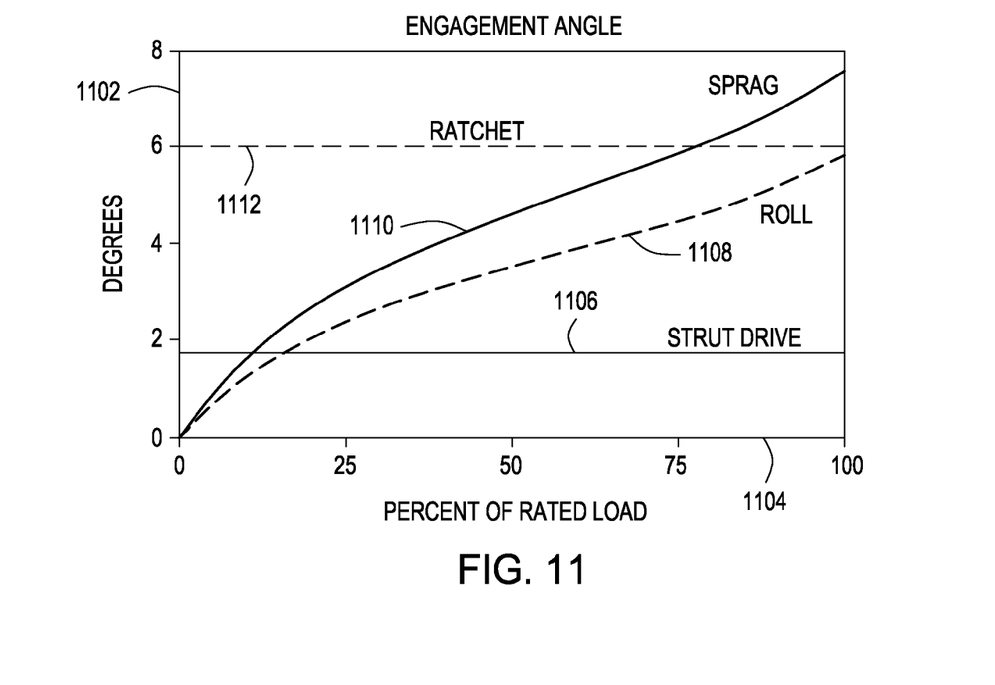
FIG. 11 depicts a graph comparing various drives versus strut drives in accordance with some embodiments of the present invention.

Moreover, the strut based overrunning pulleys of the present invention provide for 100 percent of rated load at a low engagement angle as compared to conventional drives of other designs. For example, FIG. 11 depicts a graph comparing engagement angle in degrees (axis 1102) versus percent of rated load (axis 1104) for strut drives (line 1106), roll drives (line 1108), sprag drives (line 1110), and ratchet drives (line 1112). As can be clearly seen from the graph, the strut drive provides 100 percent of the rated load at a low engagement angle, as well as providing 100 percent of the rated load almost instantaneously as the strut is engaged.

Thus, strut based overrunning pulley designs have been disclosed herein that provide one or more of greater durability, lower heat generation, capability of carrying high torque loads, potentially tunable vibration dampening, tunable to maximum permissible torque loads before elastic (repeatable) slippage, and/or ease of end of life assessment.

While the foregoing is directed to embodiments of the present invention, other and further embodiments of the invention may be devised without departing from the basic scope thereof, and the scope thereof is determined by the claims that follow.

The invention claimed is:

1. An assembly for selectively coupling torque between rotating components, comprising:
   a pocket plate configured to be disposed about a shaft and having a plurality of pockets formed on a first side thereof;
   a notch plate configured to be disposed about the shaft and adjacent the pocket plate, the notch plate having a plurality of notches formed on a side of the notch plate facing the pockets of the pocket plate;
   a plurality struts disposed in the pockets;
   a first resilient member disposed within the pockets and biasing the struts towards the notches;
   a body disposed about the pocket plate and the notch plate;
   a second resilient member disposed in a second pocket formed in a second side of the pocket plate opposite the first side; and
   a lock plate disposed adjacent the pocket plate, the lock plate having a protrusion extending into the second pocket and configured to compress the second resilient member when rotated thereagainst;
   wherein one of the pocket plate or the notch plate is configured to be rotationally coupled to the shaft and the other of the pocket plate or the notch plate is rotationally coupled to the body.

2. The assembly of claim 1, wherein the struts are in a planar orientation, perpendicular to the axis of shaft rotation.

3. The assembly of claim 1, wherein the struts are in a radial orientation, parallel to the axis of shaft rotation.

4. The assembly of claim 3, further comprising:
   one or more washers disposed on either side of the struts that guide the movement of the struts and hold back a back edge of the struts.

5. The assembly of claim 3, further comprising:
   a shaft disposed through the pocket plate and the notch plate, wherein the shaft and the pocket plate are integrally formed as a single component.

6. The assembly of claim 3, wherein the body and the notch plate are integrally formed as a single component.

7. The assembly of claim 1, further comprising:
   a shaft disposed through the pocket plate and the notch plate;
   a starter motor rotationally coupled to the shaft; and
   a flywheel of an engine rotationally coupled to the body, wherein the body and the flywheel are configured to remain rotationally coupled before, during, and after operation of the starter motor.

8. The assembly of claim 1, wherein the struts further comprise a beveled edge for engaging with the notches.

9. The assembly of claim 1, wherein the body is coupled to the notch plate and wherein the body and notch plate comprise a one piece molded part.

10. The assembly of claim 1, wherein the body comprises at least one of a plastic, thermoplastic, thermoset, or resin.

11. The assembly of claim 1, wherein the second resilient member comprises an elastomeric material.

12. The assembly of claim 1, wherein the body comprises one of a grooved or flat pulley body, a gear, or a sprocket.

13. An assembly for selectively coupling torque between rotating components, comprising:
- a pocket plate configured to be disposed about a shaft having an axis of rotation and having a plurality of pockets formed on a first side thereof;
- a notch plate configured to be disposed about the shaft and adjacent the pocket plate, the notch plate having a plurality of notches formed on a side of the notch plate facing the pockets of the pocket plate;
- a plurality struts disposed in the pockets;
- a resilient member disposed within the pockets and biasing the struts towards the notches;
- a body disposed about the pocket plate and notch plate;
- a compression ring configured to be disposed about the shaft and disposed within the body;
- a compression plate configured to be disposed about the shaft and disposed within the body, the compression plate further disposed between the compression ring and the notch plate, wherein the compression plate is rotationally coupled to the pulley body and axially movable with respect to the axis of rotation of the shaft; and
- a plurality of ramps formed on one of the notch plate or the compression ring and a plurality of corresponding inverted ramps formed on the other of the notch plate or the compression ring, the ramps and inverted ramps meshing to rotationally couple the notch plate to the body via the compression plate;
- wherein one of the pocket plate or the notch plate is configured to be rotationally coupled to the shaft and the other of the pocket plate or the notch plate is rotationally coupled to the body.

14. The assembly of claim 13, wherein the compression ring comprises an elastomeric material.

15. The assembly of claim 13, further comprising:
- a support washer configured to be disposed about the shaft and disposed within the body, adjacent the compression ring and opposite the compression plate; and
- a lock ring coupled to the body and securing the support washer, compression ring, compression plate, and notch plate within the body 16. The assembly of claim 13, wherein the compression plate is axially moveable by an amount greater than the distance that the ramps extend beyond the surface on which they are formed.

17. The assembly of claim 13, wherein the compression plate is axially moveable by an amount less than the distance that the ramps extend beyond the surface on which they are formed.

18. The assembly of claim 13, further comprising:
- a shaft disposed through the pocket plate and the notch plate, wherein one of the pocket plate or the notch plate is rotationally coupled to the shaft and the other of the pocket plate or the notch plate is rotationally coupled to the body.

* * * * *